United States Patent
Yu et al.

(10) Patent No.: US 10,303,268 B2
(45) Date of Patent: May 28, 2019

(54) FLEXIBLE COMPONENT-BASED INTERACTIVE METHOD AND INTERACTIVE APPARATUS, AND USER EQUIPMENT

(71) Applicant: BEIJING ZHIGU RUI TUO TECH CO., LTD., Beijing (CN)

(72) Inventors: Kuifei Yu, Beijing (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 7 days.

(21) Appl. No.: 15/551,842

(22) PCT Filed: Jan. 7, 2016

(86) PCT No.: PCT/CN2016/070420
§ 371 (c)(1),
(2) Date: Aug. 17, 2017

(87) PCT Pub. No.: WO2016/134623
PCT Pub. Date: Sep. 1, 2016

(65) Prior Publication Data
US 2018/0039338 A1    Feb. 8, 2018

(30) Foreign Application Priority Data
Feb. 28, 2015    (CN) .......................... 2015 1 0091772

(51) Int. Cl.
*G09G 5/00*    (2006.01)
*G06F 3/0338*    (2013.01)
(Continued)

(52) U.S. Cl.
CPC .......... *G06F 3/0338* (2013.01); *G06F 1/1652* (2013.01); *G06F 3/016* (2013.01);
(Continued)

(58) Field of Classification Search
CPC ...... G06F 3/017; G06F 3/0416; G06F 3/0488; G06F 3/0485; G06F 3/0346;
(Continued)

(56) References Cited

U.S. PATENT DOCUMENTS 8,994,651 B2 *    3/2015    Park ....................... G09G 3/001
                                                          345/156
2010/0011291 A1    1/2010    Nurmi
(Continued)

FOREIGN PATENT DOCUMENTS

CN    102820004 A    12/2012
CN    103389866 A    11/2013
(Continued)

OTHER PUBLICATIONS

International Search Report and Written Opinion for Application No. PCT/CN2016/070420, dated Apr. 1, 2016, 7 pages.
(Continued)

*Primary Examiner* — Duc Q Dinh
(74) *Attorney, Agent, or Firm* — Sheppard Mullin Richter & Hampton LLP (57) ABSTRACT

Embodiments of this application disclose flexible component-based interactive methods and interactive apparatus and user equipment. A method disclosed herein comprises: in response to a task trigger operation for triggering a task, acquiring deformation information corresponding to a deformation generated by the flexible component based on the task trigger operation, wherein after deforming, the flexible component corresponds to a first shape; and controlling, according to execution progress of the task, the flexible component to recover from the first shape to a second shape, according to execution progress information of the task and the deformation information. In the technical solutions of the embodiments of this application, execution progress of (Continued)

the task may be visually fed back by using recovery of deformation related to task triggering and naturally the task is associated with an execution progress indication of the task, thereby improving user experience.

20 Claims, 5 Drawing Sheets

(51) Int. Cl.
  *G06F 3/0487* (2013.01)
  *G06F 1/16* (2006.01)
  *G06F 3/01* (2006.01)
  *H04M 1/02* (2006.01)

(52) U.S. Cl.
  CPC ............ *G06F 3/017* (2013.01); *G06F 3/0487* (2013.01); *H04M 1/0268* (2013.01)

(58) Field of Classification Search
  CPC .... G06F 1/1641; G06F 1/1677; G06F 1/1652; G06F 3/04847; G06F 2203/04808; G06F 1/1626; G06F 3/04845; G06F 2203/04106; G06F 2203/04803; G06F 3/04842; G06F 3/0414
  See application file for complete search history.

(56) References Cited

U.S. PATENT DOCUMENTS

| | | |
|---|---|---|
| 2012/0313862 A1 | 12/2012 | Ko et al. |
| 2014/0004906 A1 | 1/2014 | Chi et al. |
| 2014/0015743 A1 | 1/2014 | Seo et al. |
| 2014/0320436 A1 | 10/2014 | Modarres et al. |
| 2014/0347287 A1 | 11/2014 | Lee et al. |
| 2015/0195926 A1* | 7/2015 | Kandur Raja ........ G06F 1/1605 348/373 |

FOREIGN PATENT DOCUMENTS

| | | |
|---|---|---|
| CN | 103516840 A | 1/2014 |
| CN | 103873670 A | 6/2014 |
| CN | 104182074 A | 12/2014 |

OTHER PUBLICATIONS

Gomes, A., et al., "MorePhone: A Study of Actuated Shape Deformations for Flexible Thin-Film Smartphone Notifications," Proceedings of the SIGCHI Conference on Human Factors in Computing Systems, ACM, 2013, p. 583-592.

Lahey, B. et al., "PaperPhone: Understanding the Use of Bend Gestures in Mobile Devices with Flexible Electronic Paper Displays," Proceedings of the SIGCHI Conference on Human Factors in Computing Systems, ACM, May 2011, p. 1303-1312.

* cited by examiner

| In response to a task trigger operation used to trigger a task, acquire deformation information corresponding to a deformation generated by the flexible component based on the task trigger operation, wherein after deforming, the flexible component corresponds to a first shape | S110 |

| Control, according to execution progress of the task, the flexible component to recover from the first shape to a second shape, according to execution progress information of the task and the deformation information | S120 |

FLEXIBLE COMPONENT-BASED INTERACTIVE METHOD AND INTERACTIVE APPARATUS, AND USER EQUIPMENT

CROSS-REFERENCE TO RELATED APPLICATIONS

The present application is a National Phase Application of International Application No. PCT/CN2016/070420, filed on Jan. 7, 2016, which claims priority to and benefit of Chinese Patent Application No. 201510091772.5, filed on Feb. 28, 2015, and entitled "Flexible Component Based Interactive Method and Interactive Apparatus, and User Equipment". Both of the above-referenced applications are which ii hereby incorporated into the present application by reference herein in their entirety.

TECHNICAL FIELD

This application generally relates to flexible component interactive technology, and in particular, to flexible component-based interactive methods and interactive apparatus, and user equipment.

BACKGROUND

With development of the flexible electronic technology, an increasing number of flexible user equipments (such as a Paperphone and a flexible wristband) appear in users' view. Properties of the flexible user equipments, as compared with those of other equipments, enable the flexible user equipments to bring special user experience for users. For example, the flexible user equipments are more suitable to wear due to the flexible feel of touch, the equipments are more suitable to carry due to their bendable and foldable properties, and interaction can be performed between the users and the flexible equipments through actions such as bending and folding.

For a task that needs whose execution may take a period of time, for example, a task of transmitting relatively a large set of data, installing an application, or playing an audio or a video, a better feedback can be provided to a user to help the user to better manage his time if execution progress of the task can be indicated. In addition, to provide a user with a progress feedback for a task that requires the user to wait for over one second is an important principle of an interactive design. Generally, execution progress of a task may be indicated through a progress bar displayed on a display screen.

SUMMARY

A possible objective of embodiments of this application is to provide a flexible component-based interactive technology.

In a first aspect, a possible implementation solution of this application provides a flexible component-based interactive method, comprising:

in response to a task trigger operation for triggering a task, acquiring deformation information corresponding to a deformation generated by the flexible component based on the task trigger operation, wherein after deforming, the flexible component corresponds to a first shape; and controlling, according to execution progress of the task, the flexible component to recover from the first shape to a second shape, according to execution progress information of the task and the deformation information.

In a second aspect, a possible implementation solution of this application provides a flexible component-based interactive apparatus, comprising:

a deformation information acquiring module, configured to: in response to a task trigger operation for triggering a task, acquire deformation information corresponding to a deformation generated by the flexible component based on the task trigger operation, wherein after deforming, the flexible component corresponds to a first shape; and a first deformation control module, configured to control, according to execution progress of the task, the flexible component to recover from the first shape to a second shape, according to execution progress information of the task and the deformation information.

According to a third aspect, a possible implementation solution of this application provides a user equipment, comprising the flexible component-based interactive apparatus described above.

In at least one implementation of the embodiments of this application, recovery of deformation of a flexible device generated by a task trigger operation that triggers a task is controlled, execution progress of the task is visually fed back to a user by using the recovery of the deformation, and the task is naturally associated with an execution progress indication of the task, thereby improving user experience.

DETAILED DESCRIPTION

Specific implementations of this application are described in further detail below with reference to the accompanying drawings (in which like elements are denoted by like reference numerals) and embodiments. The following embodiments are intended to describe the present application, but not to limit the scope of the present application.

A person skilled in the art can understand that the terms such as "first" or "second" in this application are only used to differentiate different steps, devices or modules, and the terms neither represent any specific technical meaning, nor represent an necessary logic sequence between the steps, the devices, or the modules.

Figure 1:
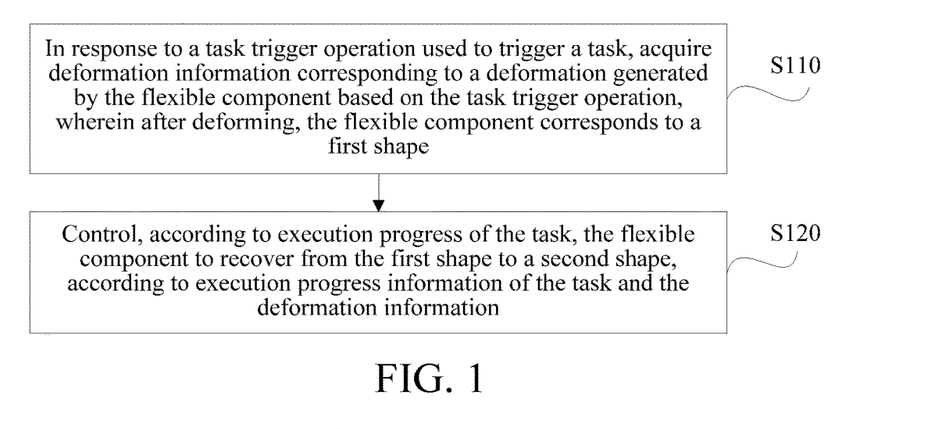
FIG. 1 is a flowchart of a flexible component-based interactive method according to an embodiment of this application.

As shown in FIG. 1, the embodiments of this application provide a flexible component-based interactive method, comprising:

S110: In response to a task trigger operation for triggering a task, acquire deformation information corresponding to a deformation generated by the flexible component based on the task trigger operation, wherein after deforming, the flexible component corresponds to a first shape.

S120: Control, according to execution progress of the task, the flexible component to recover from the first shape to a second shape, according to execution progress information of the task and the deformation information.

For example, an interactive apparatus provided by this application as an execution body of this embodiment performs S110 and S120. Specifically, the interactive apparatus may be set in a user equipment by means of software, hardware, or a combination of the software and the hardware. Alternatively, the interactive apparatus is the user equipment. The user equipment comprises, but not limited to: portable electronic devices such as a smart phone, a smart wristband, and a tablet.

In the implementations of the embodiments of this application, recovery of deformation of a flexible device generated by a task trigger operation that triggers a task is controlled, execution progress of the task is visually fed back to a user by using the recovery of the deformation, and naturally the task is associated with an execution progress indication of the task, thereby improving user experience.

Steps of the embodiments of this application are further described through the following implementations:

S110: In response to a task trigger operation for triggering a task, acquire deformation information corresponding to a deformation generated by the flexible component based on the task trigger operation.

Optionally, in a possible implementation, the task comprises:

a task to be executed for over a set period of time. For example, the task comprises one of the following tasks generally needing to be executed for a relatively long period of time: data transmission, application program installation, audio or video playing, and the like.

A length of the set period of time may be manually set according to needs of the user, or may be a length that is set by default.

A person skilled in the art would know that in a situation in which an execution time of a task is relatively short, generally, there is no need to indicate progress of the task. Therefore, in a possible implementation, for a task to be executed for a time within a set period of time, there is no need to indicate progress of the task through the recovery of the deformation.

Certainly, a person skilled in the art would know that in other possible implementations, the task may also be a task matching another condition. For example, in a possible implementation, the task comprises: a task matching a set task type.

Optionally, in a possible implementation, the task trigger operation comprises:

a force application action for forcing the flexible component to generate the deformation.

For example, the force application action may be initiated by a user. For example, during an interaction between the user and a flexible user equipment, the interaction with the flexible user equipment can be performed by exerting force application actions such as bending, folding, twisting, stretching, or compressing on a flexible component of the flexible user equipment. For example, in some possible implementations, a user may send a control instruction, a data transmission instruction, for example, by bending at least one corner or at least one edge of the flexible component. Therefore, in this implementation, after the force application action by the user onto the flexible component causes the deformation and triggers the task, the method of the implementation indicates execution progress of the task by controlling the recovery of the deformation, which not only readily provides a visual feedback of the execution progress of the task to the user, but also naturally associates the task with the execution progress indication, and provides improved user experience to the user.

Optionally, in a possible implementation, for example, the force application action comprises:

a bending force application action which forces the flexible component to generate a bending deformation, wherein the deformation comprises the bending deformation.

Certainly, a person skilled in the art may know that in addition to the bending force application action, the force application action may also be another force application action that forces the flexible component to generate another deformation, for example, a folding force application action corresponding to a folding deformation, or a twisting force application action corresponding to a twisting deformation.

Optionally, in a possible implementation, the task trigger operation may be, for example, an operation that a user triggers a task trigger module (such as touching or pressing a virtual or physical button). Alternatively, in a possible implementation, the task trigger operation may not be initiated by a user. For example, the task trigger operation may be information or an instruction sent by another apparatus and for triggering a task, for example, transmission information sent by a peripheral device and for triggering receiving of data from the peripheral device. In a possible implementation, the acquiring the deformation information in response to the task trigger operation comprises:

in response to the task trigger operation, determining the deformation information;

and after determining the deformation information, the method further comprises:

controlling the flexible component to generate the deformation according to the deformation information.

In some possible implementations, when the flexible component is controlled to generate the deformation, a deformation quantity of the deformation is a preset fixed value. In this situation, default deformation information may be determined according to the task trigger operation. In other possible implementations, deformation quantities of the deformation corresponding to different tasks may be different. For example, in a possible implementation, the determining the deformation information comprises:

determining the deformation information according to a total execution quantity of the task.

The total execution quantity of the task here may be a total quantity of executed volume of the task (for example, a total quantity of bytes of transmitted data or a total quantity of bytes of a video), and may also be a total amount of time for which the task is executed (for example, a total estimated time of data transmission or a total time of video display).

For example, in a possible implementation, the task is receiving data that is sent by a peripheral device. In this situation, a value of the deformation quantity of the deformation may be determined according to a value of the quantity of the data transmission. For example, when the quantity of the data transmission is 1 G, the flexible component is controlled to bend by 30 degrees. When the quantity of the data transmission is 2 G, the flexible component is controlled to bend by 60 degrees.

Optionally, in a possible implementation, the deformation information comprises at least one deformation parameter variation associated with the deformation.

In a possible implementation, the deformation parameter variation comprises the deformation quantity of the deformation, for example, the above bending angle of the flexible component.

In a possible implementation, the deformation parameter variation may be, for example, information of a voltage or a current corresponding to the deformation generated by the force application action of the user. Alternatively, in a possible implementation, the deformation parameter variation may be, for example, information of a voltage or a current to be applied to the flexible component to control the flexible component to generate the deformation.

In a possible implementation, before step S110, the method further comprises:
detecting the task trigger operation.
The step S110 is performed after detecting the task trigger operation.

S120: Control, according to execution progress of the task, the flexible component to recover from the first shape to a second shape, according to execution progress information of the task and the deformation information.

In a possible implementation, the execution progress information may comprise, for example, at least one of the following information related to the execution progress of the task: an execution speed, a time during which the execution has been performed and a total needed execution time, a ratio of the time during which the execution has been performed to the total needed execution time, an executed quantity and a total task quantity, and a ratio of the executed quantity to the total task quantity, of the task.

Figure 2A:
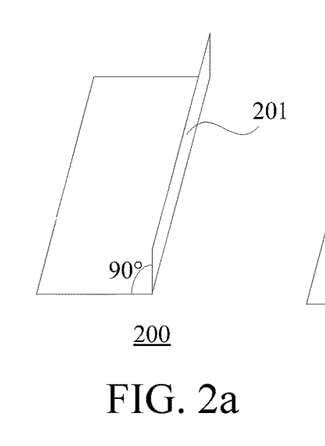
FIG. 2a to FIG. 2c are schematic application diagrams of an interactive method according to an embodiment of this application.
Figure 2B:
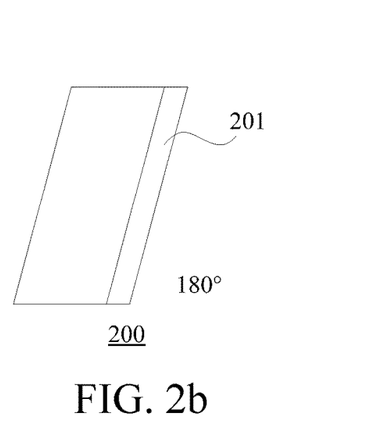
Figure 2C:
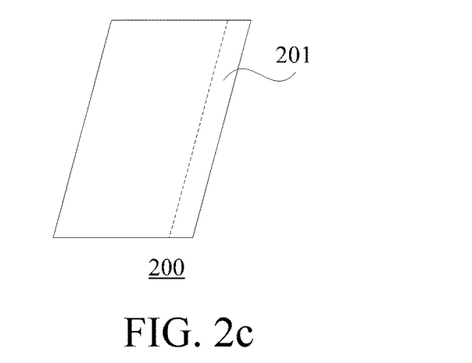

In a possible implementation, the second shape may be, for example, an initial shape of the flexible component. The initial shape is the shape before any deforming is performed on the flexible component, for example, a flat shape. In another possible implementation, for example, another deforming is performed on the part of the flexible component before performing the deforming corresponding to the task on the flexible component, and in this situation the second shape may be, for example, a shape after the another deformation. For example, as shown in FIG. 2a, an edge 201 of a flexible component 200 is folded by 90 degrees before performing the deforming (for example, a call by a user using the flexible component is corresponding to the deformation of being folded by 90 degrees). Further, after the task trigger operation is generated, as shown in FIG. 2b, the edge of the flexible component is folded by another 90 degrees, that is, after the deforming the edge is folded by 180 degrees. In this situation, in a possible implementation, the second shape may be a flat shape before being folded, as shown in FIG. 2c. In another possible implementation, the second shape may further be a shape that is folded by 90 degrees shown in FIG. 2a.

In a possible implementation, step S120 comprises:
determining a deformation recovering speed of the flexible component according to the execution progress information and the deformation information; and
controlling the flexible component to recover from the first shape to the second shape at the deformation recovering speed.

For example, in a possible implementation, if the execution progress information is executing 1% of the total task per second and the deformation information is a deformation quantity of the deformation, the deformation recovering speed may be, for example, recovering 1% of the total deformation quantity per second.

For example, in an implementation that the deformation of the flexible component is controlled by using a memory alloy, the deformation information may be information of a voltage that is applied on the memory alloy. In this implementation, the flexible component may be controlled to recover from the first shape to the second shape by controlling a change of the voltage applied on the memory alloy.

In some possible implementations, the execution progress of the task may not be performed at a constant speed. For example, in a data transmission task, due to influences of factors such as network quality and occupation of equipment resources, the speed of data transmission is not a fixed value, but rather changes with time. Therefore, in a possible implementation, the determining the deformation recovering speed according to the execution progress information and the deformation progress information comprises:
acquiring current deformation information of the flexible component and current execution progress information of the task according to a set time interval; and
adjusting the deformation recovering speed according to the current deformation information and the current execution progress information.

A person skilled in the art would learn that through this implementation, the execution progress can be reflected more accurately for a task whose execution speed might vary.

In a possible implementation, an execution body of the method is only configured to indicate the progress of the task, but not configured to trigger execution of the task (the execution of the task is triggered by another apparatus).

Moreover, in another possible implementation, the execution body of the method may further be configured to trigger execution of the task. In this implementation, the method further comprises:
in response to the task trigger operation, triggering execution of the task.

In a possible implementation, the method further comprises:
in response to a recovering force application operation which accelerates recovery of the flexible component to the second shape, generating task cancellation information for canceling the task.

For example, by using the above sending a data transmission instruction by bending a corner of a flexible component by a user as an example for description, after the data transmission instruction is sent, execution of a data transmission task is triggered. During the execution process of the data transmission task, if the user or another user needs to cancel execution the data transmission task, the data transmission task may be cancelled through a recovering force application operation of flattening the bent corner of the flexible component.

It can be seen from this implementation that the deformation of the flexible component is associated with the execution of the task. Therefore, by canceling the execution of the task through the recovering force application operation applied on the flexible component, a natural method that satisfies operation habits of a user is provided, thereby improving user experience.

A person skilled in the art could understand that in various embodiments of the present application, the value of the serial number of each step described above does not mean an execution sequence, and the execution sequence of each step should be determined according to the function and internal logic thereof, and should not be any limitation on the implementation process of the embodiments of this application.

Figure 3:
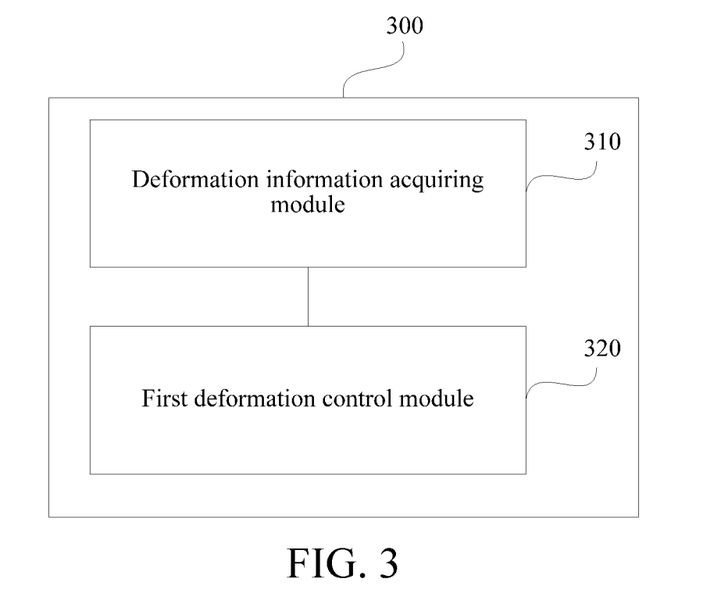
FIG. 3 is a structural block diagram of a flexible component-based interactive apparatus according to an embodiment of this application.

As shown in FIG. 3, a possible implementation of the embodiments of this application discloses a flexible component-based interactive apparatus 300, comprising:

a deformation information acquiring module 310, configured to: in response to a task trigger operation for triggering a task, acquire deformation information corresponding to a deformation generated by the flexible component based on the task trigger operation, wherein after deforming, the flexible component corresponds to a first shape; and a first deformation control module 320, configured to control, according to execution progress of the task, the flexible component to recover from the first shape to a second shape, according to execution progress information of the task and the deformation information.

In the implementations of the embodiments of this application, recovery of deformation of a flexible device generated by a task trigger operation that triggers a task is controlled, execution progress of the task is visually fed back to a user by using the recovery of the deformation, and naturally the task is associated with an execution progress indication of the task, thereby improving user experience.

Modules and units of the embodiments of this application are further described through the following implementations.

Optionally, in a possible implementation, the task comprises:

a task to be executed for over a set period of time. For example, the task comprises one of the following tasks generally needing to be executed for a relatively long period of time: a data transmission task, application program installation, audio or video playing, or the like.

Optionally, in a possible implementation, the execution progress information may comprise, for example, at least one of the following: information related to the execution progress of the task, for example, an execution speed, a time during which the execution has been performed and a total needed execution time, a ratio of the time during which the execution has been performed to the total needed execution time, an executed quantity and a total task quantity, and a ratio of the executed quantity to the total task quantity, of the task.

Optionally, in a possible implementation, the second shape may be, for example, an initial shape of the flexible component, that is, a shape before any deforming is performed on the flexible component. In another possible implementation, for example, another deforming is performed on the part of the flexible component before performing the deforming corresponding to the task on the flexible component, and in this situation, the second shape may be, for example, a shape corresponding to the another deformation.

Optionally, in a possible implementation, the task trigger operation comprises:

a force application action forcing the flexible component to generate the deformation.

During an interaction between the user and a flexible user equipment, the interaction with the flexible user equipment can be performed by exerting force application actions such as bending, folding, twisting, stretching, or compressing on a flexible component of the flexible user equipment. In this implementation, the task trigger operation may be the force application action.

Optionally, in a possible implementation, the force application action comprises:

a bending force application action which forces the flexible component to generate a bending deformation, wherein the deformation comprises the bending deformation.

Certainly, a person skilled in the art may know that in addition to the bending force application action, the force application action may also be another force application action that forces the flexible component to generate another deformation, for example, a folding force application action corresponding to a folding deformation, or a twisting force application action corresponding to a twisting deformation.

Optionally, in a possible implementation, the task trigger operation may be, for example, an operation that a user triggers a task trigger module. Alternatively, in a possible implementation, the task trigger operation may not be initiated by the user. For example, the task trigger operation may be information or an instruction for triggering a task and from other apparatuses, for example, transmission information sent by a peripheral device and for triggering reception of data from the peripheral device.

Figure 4A:
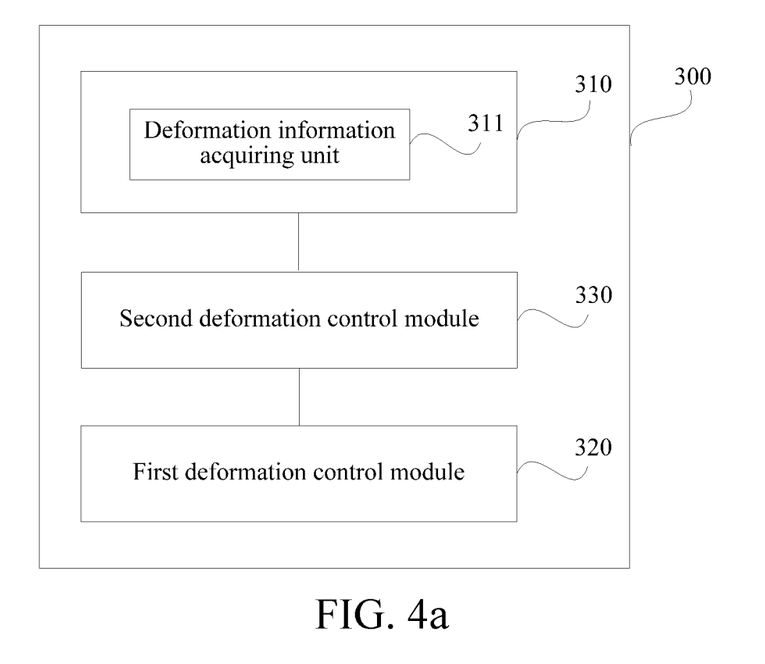
FIG. 4a is a structural block diagram of a flexible component-based interactive apparatus according to an embodiment of this application.

Optionally, as shown in FIG. 4a, in a possible implementation, the deformation information acquiring module 310 comprises:

a deformation information determining unit 311, configured to determine the deformation information in response to the task trigger operation.

The apparatus 300 further comprises:

a second deformation control module 330, configured to control, according to the deformation information, the flexible component to generate the deformation.

Figure 4B:
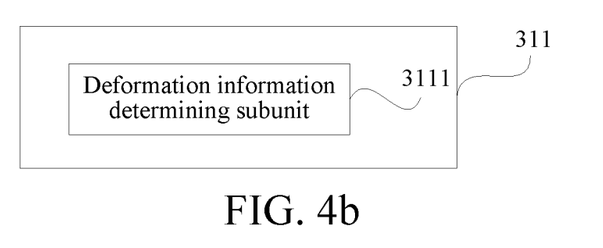
FIG. 4b is a structural block diagram of a deformation information determining unit of a flexible component-based interactive apparatus according to an embodiment of this application.

Optionally, as shown in FIG. 4b, in a possible implementation, the deformation information determining unit 311 comprises:

a deformation information determining subunit 3111, configured to determine the deformation information according to a total execution quantity of the task.

Optionally, in a possible implementation, the deformation information comprises at least one of the following:

at least one deformation parameter variation associated with the deformation.

Figure 4C:
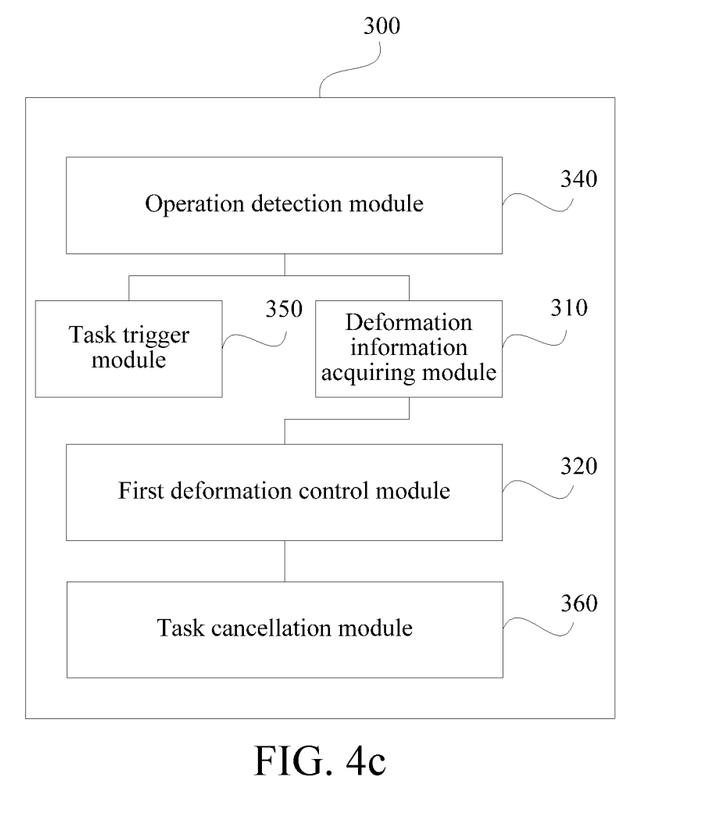
FIG. 4c is a structural block diagram of a flexible component-based interactive apparatus according to an embodiment of this application.

Optionally, as shown in FIG. 4c, in a possible implementation, the apparatus 300 further comprises:

an operation detection module 340, configured to detect the task trigger operation.

For example, in a possible implementation, the task trigger operation is touching a virtual button. In this situation, the operation detection module 340 may comprise a touch sensor.

In a possible implementation, the apparatus 300 may only be configured to indicate the progress of the task. In addition, optionally, as shown in FIG. 4c, in another possible implementation, the apparatus 300 further comprises:

a task trigger module 350, configured to trigger execution of the task in response to the task trigger operation.

Optionally, as shown in FIG. 4c, in a possible implementation, the apparatus 300 further comprises:

a task cancellation module 360, configured to: in response to a recovering force application operation which accelerates recovery of the flexible component to the second shape, generate task cancellation information for canceling the task.

It can be seen from the implementation that the deformation of the flexible component is associated with the execution of the task. Therefore, by canceling the execution of the task through the recovering force application operation applied on the flexible component, a natural method that satisfies operation habits of a user is provided, thereby improving user experience.

Figure 4D:
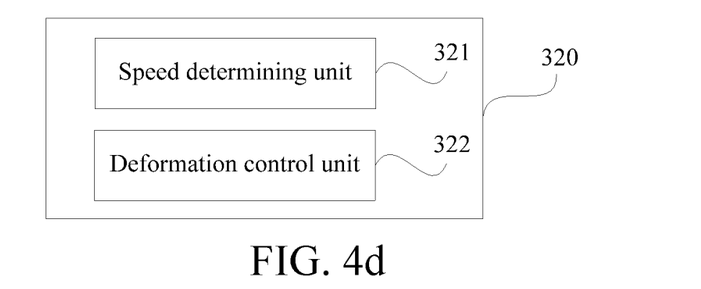
FIG. 4d is a structural block diagram of a first deformation control module of a flexible component-based interactive apparatus according to an embodiment of this application.

Optionally, as shown in FIG. 4d, in a possible implementation, the first deformation control module 320 comprises:

a speed determining unit 321, configured to determine a deformation recovering speed of the flexible component according to the execution progress information and the deformation information; and a deformation control unit 322, configured to control the flexible component to recover from the first shape to the second shape at the deformation recovering speed.

Figure 4E:
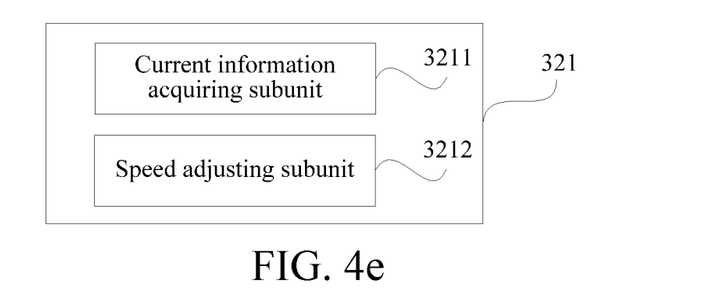
FIG. 4e is a structural block diagram of a speed determining unit of a flexible component-based interactive apparatus according to an embodiment of this application.

In some possible implementations, the execution progress of the task may not be performed at a constant speed, but changing with time. Therefore, optionally, as shown in FIG. 4e, in a possible implementation, the speed determining unit 321 comprises:

a current information acquiring subunit 3211, configured to acquire current deformation information of the flexible component and current execution progress information of the task according to a set time interval; and a speed adjusting subunit 3212, configured to adjust the deformation recovering speed according to the current deformation information and the current execution progress information.

Further description of functional implementation of the modules, the units, and the subunits in the embodiment of this application can be referred to in the corresponding description of the embodiment shown in FIG. 1.

Figure 5:
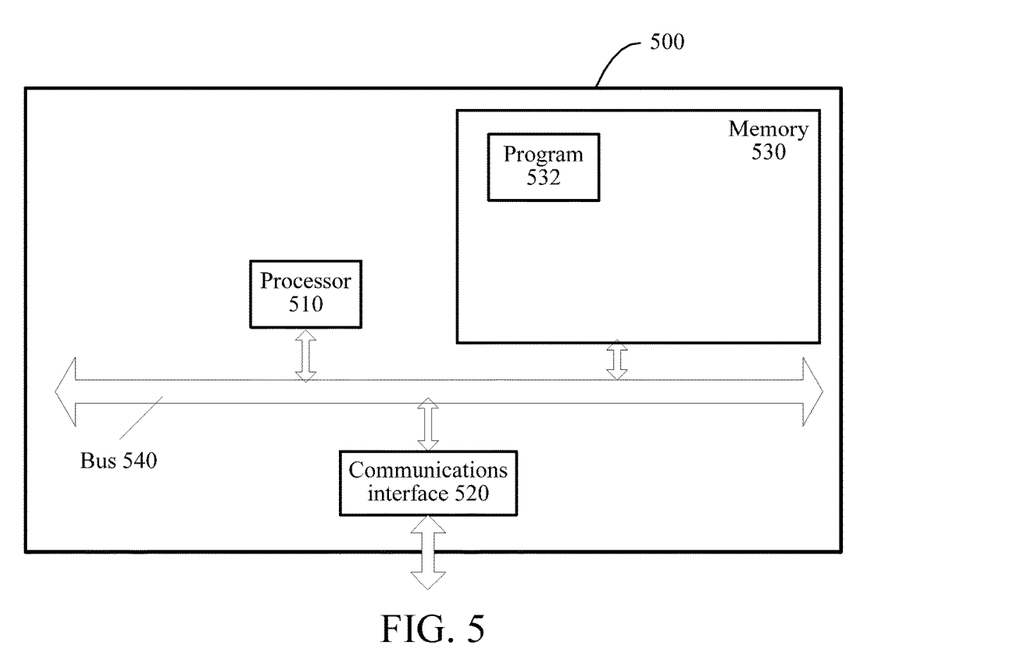
FIG. 5 is a structural block diagram of a flexible component-based interactive apparatus according to an embodiment of this application.

FIG. 5 is another schematic structural block diagram of a flexible component-based interactive apparatus 500 according to an embodiment of this application. Specific embodiments of this application do not limit specific implementation of the interactive apparatus 500. As shown in FIG. 5, the interactive apparatus 500 may comprise:

a processor (processor) 510, a communications interface (Communications Interface) 520, a memory (memory) 530, and a communications bus 540.

The processor 510, the communications interface 520, and the memory 530 communicate with each other by using the communications bus 540.

The communications interface 520 is configured to communicate with a network element such as a client.

The processor 510 is configured to execute a program 532, and specifically can perform relevant steps in the foregoing method embodiment.

Specifically, the program 532 may comprise program code. The program code comprises computer operation instructions.

The processor 510 may a central processing unit (CPU), an application specific integrated circuit (ASIC), or one or more integrated circuits configured implement the embodiments of this application.

The memory 530 is configured to store the program 532. The memory 530 may comprise a high-speed RAM memory, and may further comprise a non-volatile memory, for example, at least one magnetic disk storage. The program 532 may specifically configured to cause the interactive apparatus 500 to execute the following steps:

in response to a task trigger operation for triggering a task, acquiring deformation information corresponding to a deformation generated by the flexible component based on the task trigger operation, wherein after deforming, the flexible component corresponds to a first shape; and controlling, according to execution progress of the task, the flexible component to recover from the first shape to a second shape, according to execution progress information of the task and the deformation information.

For specific implementation of steps in the program 532, reference may be made to the corresponding descriptions of corresponding steps and units in the foregoing embodiments, which are not described herein again. A person skilled in the art may clearly understand that, for the purpose of convenient and brief description, reference may be made to the description of corresponding processes in the foregoing method embodiments for detailed working processes of the foregoing devices and modules, and details are not described herein again.

Figure 6:
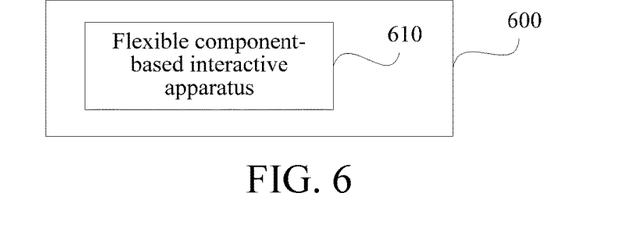
FIG. 6 is a structural block diagram of a user equipment according to an embodiment of this application.

As shown in FIG. 6, a possible implementation of the embodiments of this application provides a user equipment 600, comprising a flexible component-based interactive apparatus 610 of any one of the implementations in FIG. 3, and FIG. 4a to FIG. 4e.

The user equipment comprises, but not limited to: portable electronic devices such as a smart phone, a smart wristband, and a tablet.

In the implementations of the embodiments of this application, recovery of deformation of a flexible device generated by a task trigger operation that triggers a task is controlled, execution progress of the task is fed back to a user by using the recovery of the deformation, and naturally the task is associated with an execution progress indication of the task, thereby improving user experience.

A person of ordinary skill in the art may be aware that, in combination with the examples described in the embodiments disclosed in this specification, units and method steps may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in a form of a software functional unit and sold or used as an independent product, the functions may be stored in a non-transitory computer-readable storage medium. Based on such an understanding, the technical solutions of this application essentially, or the part contributing to the existing art, or all or a part of the technical solutions may be implemented in the form of a software product. The computer software product is stored in a storage medium and comprises several instructions for instructing a computer device (which may be a personal computer, a server, or a network device) or a processor to perform all or a part of the steps of the methods in the embodiments of this application. The foregoing storage medium comprises: any medium that can store program code such as a USB flash drive, a removable hard disk, a read-only memory (ROM), a random access memory (RAM), a magnetic disk, or an optical disc.

The above implementations are only used to describe this application, rather than limit this application; various alterations and modifications may be made by those of ordinary skill in the art without departing from the spirit and scope of this application, so all equivalent technical solutions also belong to the scope of this application, and the scope of patent protection scope of this application should be defined by the claims.

What is claimed is:

1. A flexible component-based interactive method, comprising:
in response to a task trigger operation for triggering a task, acquiring deformation information corresponding to a deformation generated by the flexible component based on the task trigger operation, wherein after deforming, the flexible component corresponds to a first shape; and
controlling, according to execution progress of the task, the flexible component to recover from the first shape to a second shape, according to execution progress information of the task and the deformation information, wherein the controlling comprises:
determining a deformation recovering speed of the flexible component according to the execution progress information and the deformation information; and
controlling the flexible component to recover from the first shape to the second shape at the deformation recovering speed,
wherein the determining a deformation recovering speed according to the execution progress information and the deformation information comprises:
acquiring current deformation information of the flexible component and current execution progress information of the task according to a set time interval; and
adjusting the deformation recovering speed according to the current deformation information and the current execution progress information.

2. The method of claim 1, wherein the task trigger operation comprises:
a force application action for forcing the flexible component to generate the deformation.

3. The method of claim 2, wherein the force application action comprises:
a bending force application action which forces the flexible component to generate a bending deformation, wherein
the deformation comprises the bending deformation.

4. The method of claim 1, wherein the acquiring the deformation information in response to the task trigger operation comprises:
in response to the task trigger operation, determining the deformation information;
and after determining the deformation information, the method further comprises:
controlling the flexible component to generate the deformation according to the deformation information.

5. The method of claim 4, wherein the determining the deformation information comprises:
determining the deformation information according to a total execution quantity of the task.

6. The method of claim 1, wherein the deformation information comprises:
at least one deformation parameter variation associated with the deformation.

7. The method of claim 1, wherein the method further comprises:
detecting the task trigger operation.

8. The method of claim 1, wherein the method further comprises:
in response to the task trigger operation, triggering execution of the task.

9. The method of claim 1, wherein the task comprises:
a task to be executed for over a set period of time.

10. The method of claim 1, wherein the method further comprises:
in response to a recovering force application operation which accelerates recovery of the flexible component to the second shape, generating task cancellation information for canceling the task.

11. A user equipment, wherein the user equipment comprising:
a storage, configured to store a program;
a processor, configured to execute the program which cause the processor to perform operations, comprising:
in response to a task trigger operation for triggering a task, acquiring deformation information corresponding to a deformation generated by the flexible component based on the task trigger operation, wherein after deforming, the flexible component corresponds to a first shape; and
controlling, according to execution progress of the task, the flexible component to recover from the first shape to a second shape, according to execution progress information of the task and the deformation information, wherein the controlling comprises:
determining a deformation recovering speed of the flexible component according to the execution progress information and the deformation information; and
controlling the flexible component to recover from the first shape to the second shape at the deformation recovering speed,
wherein the determining a deformation recovering speed according to the execution progress information and the deformation information comprises:
acquiring current deformation information of the flexible component and current execution progress information of the task according to a set time interval; and
adjusting the deformation recovering speed according to the current deformation information and the current execution progress information.

12. The user equipment of claim 11, wherein the task trigger operation comprises:
a force application action for forcing the flexible component to generate the deformation.

13. The user equipment of claim 12, wherein the force application action comprises:
a bending force application action which forces the flexible component to generate a bending deformation, wherein
the deformation comprises the bending deformation.

14. The user equipment of claim 11, wherein the operations further comprise:
determining the deformation information in response to the task trigger operation; and
controlling, according to the deformation information, the flexible component to generate the deformation.

15. The user equipment of claim 14, wherein the operations further comprise:
determining the deformation information according to a total execution quantity of the task.

16. The user equipment of claim 11, wherein the deformation information comprises:
at least one deformation parameter variation associated with the deformation.

17. The user equipment of claim 11, wherein the operations further comprise:
   detecting the task trigger operation.

18. The user equipment of claim 11, wherein the operations further comprise:
   triggering execution of the task in response to the task trigger operation.

19. The user equipment of claim 11, wherein the task comprises:
   a task to be executed for over a set period of time.

20. The user equipment of claim 11, wherein the operations further comprise:
   in response to a recovering force application operation which accelerates recovery of the flexible component to the second shape, generating task cancellation information for canceling the task.

* * * * *